(12) United States Patent
Furukawa et al.

(10) Patent No.: US 8,144,549 B2
(45) Date of Patent: Mar. 27, 2012

(54) HEAD STACK ASSEMBLY AND INFORMATION RECORDING APPARATUS

(75) Inventors: Masaru Furukawa, Fujisawa (JP); Yukio Kato, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 1141 days.

(21) Appl. No.: 11/952,239

(22) Filed: Dec. 7, 2007

(65) Prior Publication Data

US 2008/0158730 A1    Jul. 3, 2008

(30) Foreign Application Priority Data

Dec. 8, 2006    (JP) ................... 2006-331319

(51) Int. Cl.
*G11B 11/00* (2006.01)
(52) U.S. Cl. .................. 369/13.24; 369/13.26
(58) Field of Classification Search ............... 369/13.24, 369/13.26; 360/59
See application file for complete search history.

(56) References Cited

U.S. PATENT DOCUMENTS

| | | | | |
|---|---|---|---|---|
| RE39,952 E | * | 12/2007 | Inokuchi et al. | 369/47.51 |
| 2003/0012093 A1 | * | 1/2003 | Tada et al. | 369/44.27 |
| 2005/0078564 A1 | | 4/2005 | Kawasaki et al. | |
| 2009/0296257 A1 | * | 12/2009 | Nakano et al. | 360/71 |

FOREIGN PATENT DOCUMENTS

| | | |
|---|---|---|
| JP | 09-145328 | 6/1997 |
| JP | 2001-236748 | 8/2001 |
| JP | 2002-245742 | 8/2002 |
| JP | 2003-317294 | 11/2003 |
| JP | 2004-14092 | 1/2004 |
| JP | 2006-88552 | 4/2006 |
| WO | WO 03/063142 | 7/2003 |

OTHER PUBLICATIONS

ED Gage, et al., Integration Challenges for Heat Assisted Magnetic Recording, Jun. 9, 2006, International Disk Forum 2006, Idema Japan.

* cited by examiner

*Primary Examiner* — Thang Tran
*Assistant Examiner* — Brenda Bernardi
(74) *Attorney, Agent, or Firm* — Antonelli, Terry, Stout & Kraus, LLP.

(57) ABSTRACT

An information recording apparatus includes a medium for recording information; a head slider including a device for writing the information onto the medium and a reflective surface for reflecting light; a light emitting portion for generating emission light toward the reflective surface; a light receiving portion for detecting light reflected on the reflective surface; and a regulating mechanism for adjusting an amount of the emission light from the light emitting portion in a mode of information recording onto the medium in correspondence to a result of the detection.

20 Claims, 10 Drawing Sheets

HEAD STACK ASSEMBLY AND INFORMATION RECORDING APPARATUS

TECHNICAL FIELD

The present invention relates to a head stack assembly and an information recording apparatus. More specifically, the present invention relates to an information recording apparatus needing to know an accurate position of a head slider, such as a heat assisted information recording apparatus that inputs light to be incident on the head slider, and further relates to a head stack assembly for use in the information recording apparatus.

BACKGROUND ART

In recent years, recording devices have continually grown in recoding capacity, and research and development are under way for realizing a device including a magnetic disk drive that has a record density exceeding 1 T bit per an area of 2.54 cm×2.54 cm (one inch square). Increasing the record density of the recording medium requires a reduction of the volume of magnetic grain composing the magnetic disk medium. Now, the magnetic grain volume is represented by V, and a magnetic energy of the grain is represented by KuV, in which "Ku" of the grain represents a magnetic anisotropic energy density. When V is reduced to improve the record density, the energy KuV is reduced, whereby a problem of thermal fluctuation is actualized in that the record information is altered due to thermal energy of about the room temperature. Generally, in order to prevent the problem of thermal fluctuation, a method of utilizing a magnetic grain having a large value of the density Ku. Generally, however, increasing the density Ku involves a proportional increase of a coercive force Hc of the magnetic grain, thereby resulting in an increase of a magnetic field strength necessary for writing (including overwriting) of magnetic information onto the magnetic disk medium. The magnetic disk drive causes a recording head, which is provided in the disk drive, to generate a magnetic field, thereby writes magnetic information. In this case, however, since the magnitude of a magnetic field strength generatable by the recording head is limited, a problem arises in that an increase in the coercive force Hc disables writing of the magnetic information.

To overcome such problems, a heat-assisted magnetic recording system has been proposed. According to the system, a magnetic grain having properties of reducing the coercive force Hc in association with the temperature increase is used. In the event of overwriting magnetic information, an overwrite- or rewrite-desired part of magnetic grain is heated by using evanescent light and Hc is temporarily reduced, thereby to write through the recording head.

A heat-assisted magnetic disk drive using a heat-assisted magnetic recording scheme includes a spindle and pivot mounted to a housing, a magnetic disk fixed to a rotational spindle, a head assembly movable on the pivot at one degree of freedom, a suspension fixed to the head assembly, a light emitting portion for emitting light, a head slider supported by a suspension, a recording head buried in a surface on a magnetic disk side of a head slider, a light receiving area ("slider light receiving area," herebelow) buried in a sidewall of the head slider, an optical waveguide buried in the head slider, and a light irradiating portion provided in the vicinity of the recording head to irradiate light onto a magnetic disk. When writing information, the magnetic field is generated by using the recording head, light is emitted from the light emitting portion. Then, the light is propagated on the slider light receiving area, and is irradiated onto the magnetic disk from the photo-injection portion from the light irradiating portion through the optical waveguide. In this manner, a process of heating the magnetic disk is performed (refer to Non-patent Publication 1 (*1) listed below).

However, the magnetic disk medium surface has alteration or deformation ("runout") along an axial direction of the spindle in association with, for example, the shape of the medium surface or distortion in the event of fixing of the medium to the spindle. The head slider followingly moves along the axial direction of the spindle in synchronism with the runout in a slightly lifted state from the medium surface due to the air bearing membrane effects. Further, there is a magnetic disk drive that has a configuration in which a head portion deflects relative to a slider portion in order to achieve a further fly height reduction of the slider. The light emitting portion for emitting heat assisted magnetic recording light is fixed to an external portion of the head slider. As such, the following-motion of the head slider or the like causes variation in relative positions of the light emitting portion and the spindle axis direction of the slider light receiving area existing on the head slider, that is, along the direction perpendicular to the medium surface.

The head slider and the light emitting portion are rotatable with respect to a plane parallel to the medium. For this reason, deflection can be caused in the relative positions of the light emitting portion and slider light receiving area along the direction parallel to the medium surface either passively due to the influence of the runout or positively due to activation of a micro-actuator provided to make fine adjustment of a position on the magnetic disk.

Because of the relative position variation along any one of the directions, the amount of light incident in the event of magnetic information writing is not fixed to a constant amount, and the amount of light irradiated onto the magnetic disk from the light injecting portion of the head slider is reduced. In this case, the amount of heat for reducing the coercive force Hc becomes insufficient, so that writing of the magnetic information is disabled—which leads to a recording error.

In order to prevent the problem of the recording error caused due to the head-slider attitudinal variation of the head slider, the amount of head-slider attitudinal variation has to be measured.

A measuring method for the amount of head-slider attitudinal variation has been proposed as disclosed in Patent Publication (*2) listed below, and a measuring method for the amount of head-slider positional variation has been proposed as disclosed in Patent Publication (*3) listed below.

(*1) Non-patent Publication 1: Ed Gage, et al, "Integration Challenges for Heat Assisted Magnetic Recording", IDEMA JAPAN International Disk Forum 2006, Jun. 9, 2006

(*2) Patent Publication 1: Japanese Unexamined Patent Application Publication No. 2002-245742

(*3) Patent Publication 2: Japanese Unexamined Patent Application Publication No. 2004-14092

DISCLOSURE OF THE INVENTION

Problem to be Solved by the Invention

However, according to the method disclosed in Patent Publication (*2), an optical system has to be provided in an upper portion of the head slider, so that it is difficult to realize the method without changing the thickness of the information recording apparatus. According to the method in Patent Publication (*3), the apparatus configuration includes fly-height measuring recording tracks, in which the fly height from the magnetic disk surface in a recording head portion of the head slider is obtained from the output obtained from the respective track. However, the method is not capable of measuring variation amounts on other or regular tracks, such as the amount of variation in the relative positions of the light emitting portion and the slider light receiving area either in the spindle axis direction or in the direction parallel to the medium surface and the amount of head-slider attitudinal variation.

Any one of the publications does not disclose the issue of heat generated by light emission of the light emitting portion.

Means for Solving the Problem

The present invention is to provide a head stack assembly including means or a mechanism of measuring an amount of variation in relative positions of a light emitting portion and a slider light receiving area either in the above-described direction (that is, either a spindle axis direction or in a direction parallel to a medium surface (surface of a recording medium)), thereby to be enabled to measure a flying attitude of a head slider, clearance measurement for the head slider, and/or control of the amount of light incident on the head slider in accordance with the amount of variation.

The present invention is to further provide an information recording apparatus enabled to record stably by adjusting an amount of light irradiated on the recording medium in the event of recording information on the recording medium.

According to one aspect of the present invention, there is provided a head stack assembly including a light emitting portion for generating emission light for irradiation onto a medium that records information; a light receiving portion for detecting light reflected on a reflective surface of a head slider including a device for writing information onto the medium and the reflective surface for reflecting the light from the light emitting portion; and a regulating mechanism for adjusting an amount of the emission light from the light emitting portion in correspondence to a value, such as the amount of light or the position of light, detected by the detection.

According to another aspect of the present invention, there is provided an information recording apparatus including a medium for recording information; a light emitting portion for generating emission light for irradiation onto the medium; a head slider including a device for writing information onto the medium and the reflective surface for reflecting the light from the light emitting portion; a light receiving portion for detecting light reflected on the reflective surface; and a regulating mechanism for adjusting an amount of the emission light from the light emitting portion in correspondence to a value detected by the detection.

According to another aspect of the present invention, there is provided an information recording apparatus including a medium for recording information; a light emitting portion for generating emission light for irradiation onto the medium; a head slider including a device for writing information onto the medium and the reflective surface for reflecting the light from the light emitting portion; a light receiving portion for detecting light reflected on the reflective surface; and an arithmetic portion for obtaining an amount of variation in a relative position of the light emitting portion and the head slider.

The information recording apparatus further include a suspension for supporting the head slider, and a head assembly for supporting the suspension, wherein the light emitting portion may be positioned in the head assembly.

The arithmetic portion may operates such as detection of contact between the medium and the head slider and detection of variation in a pitch angle of the head slider in accordance with fluctuation in the amount of variation. The arithmetic portion may output a notification of an abnormal state in the event that a value exceeding a predetermined amount of variation is continued for a time period longer than a predetermined time period.

According to another aspect of the present invention, there is provided an emission light amount adjusting method including the steps of generating emission light toward a head slider; reflecting light incident on the head slider; and detecting/measuring the reflected light; and adjusting an amount of the emission light in correspondence to a result of the detection/measurement.

As an example, the step of adjusting an amount of the emission light in correspondence to a result of the detection/measurement may include the step of obtaining an amount of light incident on a light receiving area of the head slider in accordance with the reflected light; and adjusting the amount of the emission light in correspondence with the obtained amount of light.

Further, as an example, the step of obtaining an amount of light incident on a light receiving area may include the steps of obtaining a center coordinate of the reflected light; and obtaining an amount of variation in a relative position of the emission light generated toward the head slider and the head slider.

Effect of the Invention

According to the present invention, an amount of motion relative to the light emitting portion of the head slider, that is, an amount of deflection in the relative position with respect to the light emitting portion, can be measured. Consequently, the amount of light incident on the head slider can be controlled by increasing or reducing the amount of light in correspondence to the amount of deflection, and a specified amount of light may be irradiated onto the medium. Further, the present invention makes it possible to perform, for example, clearance measurement for detecting contact/non-contact between the head slider and the medium in accordance with a variation in or an average of the amount of deflection, and measurement of a variation in a flying attitude, such as pitch angle, of the head slider.

Further, according to the present invention, by increasing or reducing the amount of light from the light emitting portion by necessity, unnecessary light emission can be prevented, and problems associated with heating in the light emitting portion can be prevented while an appropriate amount of emission light is being secured.

BEST MODE FOR CARRYING OUT THE INVENTION

A heat-assisted magnetic disk drive according to one embodiment of the present invention will be described herebelow with reference to FIGS. 1 to 6. In the respective drawings, like numerals designate like components (or portions) or equivalents thereof.

Figure 1:
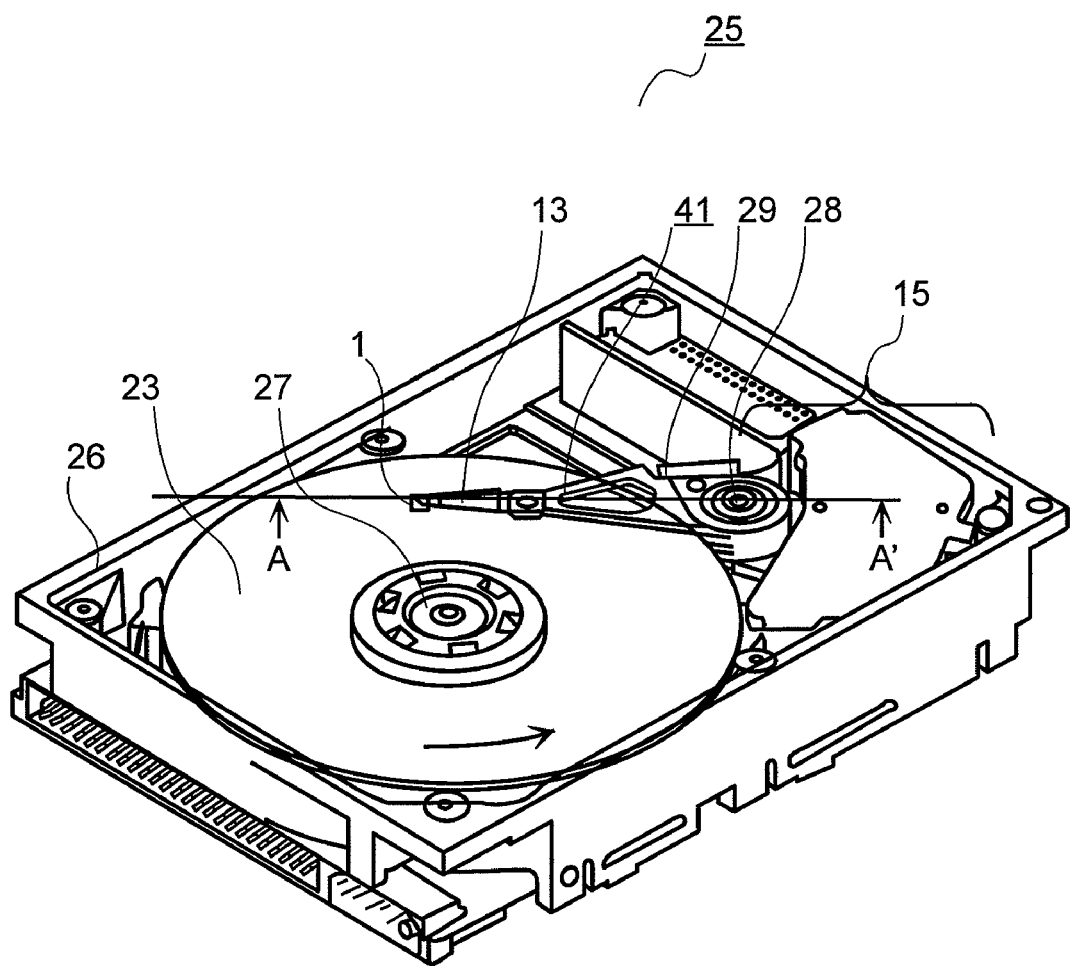
FIG. 1 is one example of a schematic view showing a heat-assisted magnetic disk drive according to one embodiment of the present invention.
Figure 2:
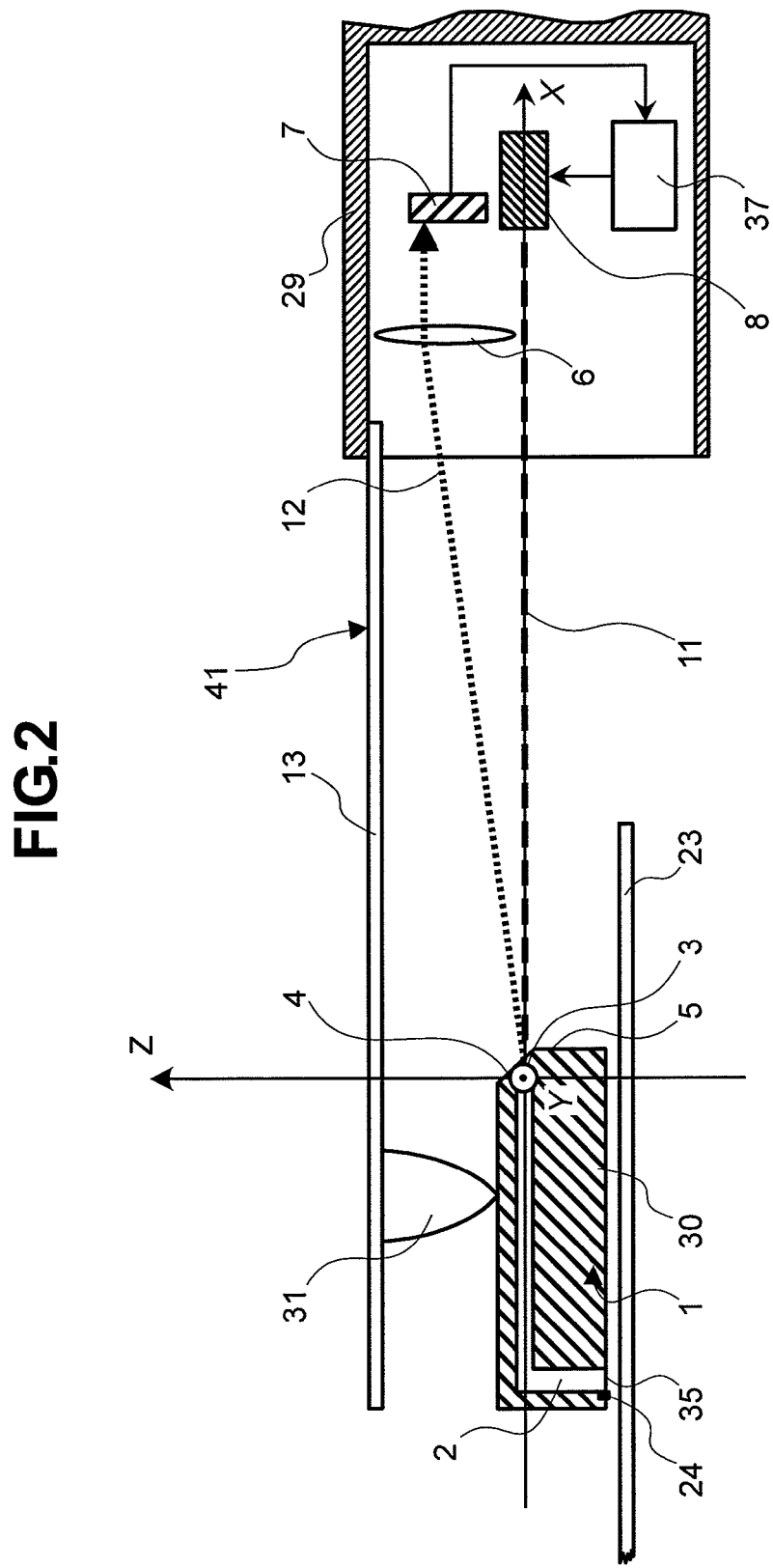
FIG. 2 is a schematic view showing one example configuration of a head slider and an optical system according to the embodiment.

FIG. 1 is a schematic view showing a heat-assisted magnetic disk drive 25 according to the present embodiment. FIG. 2 is a cross sectional view taken along the line A-A' of FIG. 1. The magnetic disk drive 25 includes a spindle 27 and pivot 28 fitted to a housing 26; a magnetic disk 23 or a recording medium fixed to the spindle 27; a stack assembly 41 pivotally rotatable about the pivot 28; and a controller (not shown) for controlling recording/playback. The stack assembly 41 includes a head slider 1; a suspension 13 for supporting the head slider 1; and a carriage portion 29 that supports the suspension 13 and that includes a light emitting portion 8, a light receiving portion 7, and a lens 6. The magnetic disk 23 is rotated by the spindle 27. With an airflow generated by magnetic disk 23, the head slider 1 flies over the magnetic disk 23 at a predetermined height or clearance therebetween. The magnetic disk drive 25 drives a voice coil motor 15 to thereby pivotally move the stack assembly 41, thereby to move the head slider 1 onto a desired track of the magnetic disk 23. Upon receipt of a write/read command from an external device such as a host or higher-order system, the controller controls components, such as a recording head 24 and the stack assembly 41, to thereby record/retrieve information on the magnetic disk 23.

A structure of the head slider 1 and an outline of an optical system will be described herebelow with reference to FIG. 2.

The head slider 1 is fixed via a dimple 31 and the suspension 13 to the carriage portion 29 inclusive of an arm. The dimple 31 and the suspension 13 are formed of metal. The dimple 31 supports by point contact at a point portion so that the head slider 1 is able to freely movable to follow the surface profile of the magnetic disk 23.

The head slider 1 further includes a slider light receiving area 3 for receiving light, for example laser light, incoming from the light emitting portion 8; a light injection portion 35 for injecting light received on the slider light receiving area 3 onto the magnetic disk 23; and an optical waveguide 2 for guiding the light from the slider light receiving area 3 to the light injection portion 35. In an upper portion (on the side of the dimple 31) of the slider light receiving area 3, there is provided an upper reflective surface 4 that reflects light irradiated on an upper portion of the slider light receiving area 3 but not irradiated on the slider light receiving area 3. In a lower portion (on the side of the magnetic disk 23 (or medium 23) of the slider light receiving area 3, there is provided a lower reflective surface 5 that reflects light irradiated on a lower portion of the slider light receiving area 3 but not irradiated on the slider light receiving area 3.

The head slider 1 has the recording head 24, which is a device for writing information onto the magnetic disk 23, provided on a longitudinally opposite side of the head slider 1 with respect to the slider light receiving area 3. On a surface opposite the magnetic disk 23, there is provided an air bearing surface 30 that has a predetermined shape that allows the head slider 1 to fly over the magnetic disk 23.

In description hereinbelow, a side of the head slider 1 where an airflow generated by the rotation of the magnetic disk 23 enters will be referred to as an "air inflow end" side. In contrast, a side of the head slider 1 where an airflow passed over the air bearing surface 30 of the head slider 1 exits will be referred to as an "air outflow end" side.

In the present embodiment, the magnetic disk 23 rotates counterclockwise (see FIG. 1). As such, the surface on the air inflow end side of the head slider 1 has the slider light receiving area 3, and the upper and lower reflective surfaces 4 and 5; and the air outflow end side of the head slider 1 has the recording head 24. Alternatively, however, the arrangement may be such that the magnetic disk 23 is rotated clockwise and the head slider 1 is oppositely directed, in which the slider light receiving area 3, the upper and lower reflective surfaces 4 and 5, and the recording head 24 are all provided on the side of the carriage portion 29. In this case, the optical waveguide 2 is formed on in the head portion, such that a specific manufacturing process is not necessary in the slider portion. More specifically, the slider light receiving area 3 and the upper and lower reflective surfaces 4 and 5 are all manufactured at the same time during the manufacture of the recording head 24, such that the manufacture of the head slider 1 is eased, consequently making it possible to reduce the manufacturing time.

The slider light receiving area 3, the optical waveguide 2, and the light injection portion 35 are formed from materials, such as optically transmissive silicon and glass materials. The upper and lower reflective surfaces 4 and 5, respectively, are formed by ion milling to be either a light reflecting surface coated with aluminium, gold, silver, or the like or a rough surface or polished surface having a degree of surface roughness sufficient to obtain reflected light.

The optical system in the present embodiment is disposed in the carriage portion 29, and includes the emitting portion 8 for emitting light towards the slider light receiving area 3; the lens 6; and the light receiving portion 7 for detecting light passed through the lens 6. An incident-light optical path 11 is an optical path for light incident on an inflow end side sidewall of the slider light receiving area 3. A reflected-light optical path 12 is an optical path for light reflected on a sidewall of the slider light receiving area 3. The lens 6 is formed using a convex lens, and the light receiving portion 7 is formed using a four-divided PD (photodetector), which is a device for converting light to current. The light emitting portion 8 is formed using an LD (laser diode), which is a device for converting current to light, and a lens that produces parallel light. In the event that the magnetic disk drive 25 receives a write command from the host (not shown) to record information onto the magnetic disk 23, the light emitting portion 8 emits light and heats the magnetic disk 23 to thereby assist the recording operation of the recording head 24. While the incident-light the optical path 11 and the reflected-light optical path 12 are used as the optical paths for propagating in the atmosphere, reflecting mirrors, optical fibers, prism beam splitters, or λ/4 wavelength plate may instead be used.

The slider light receiving area 3 of the present embodiment receives light at a right angle from the light emitting portion 8. As such, the slider light receiving area 3 is formed with a tilted angle corresponding to an attack angle in the event of flight of the head slider 1 from the air bearing surface 30.

Figure 3:
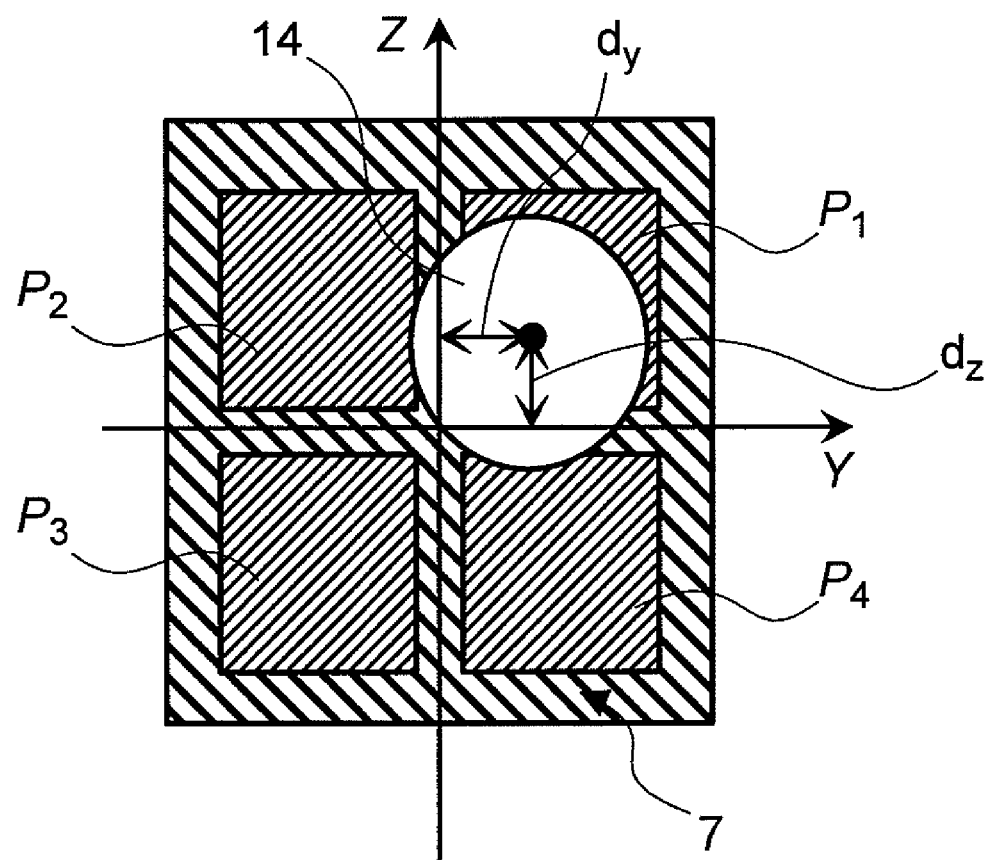
FIG. 3 is an explanatory view showing one example of a method of obtaining a spot position on a PD device (surface) of a quadruple PD.
Figure 4:
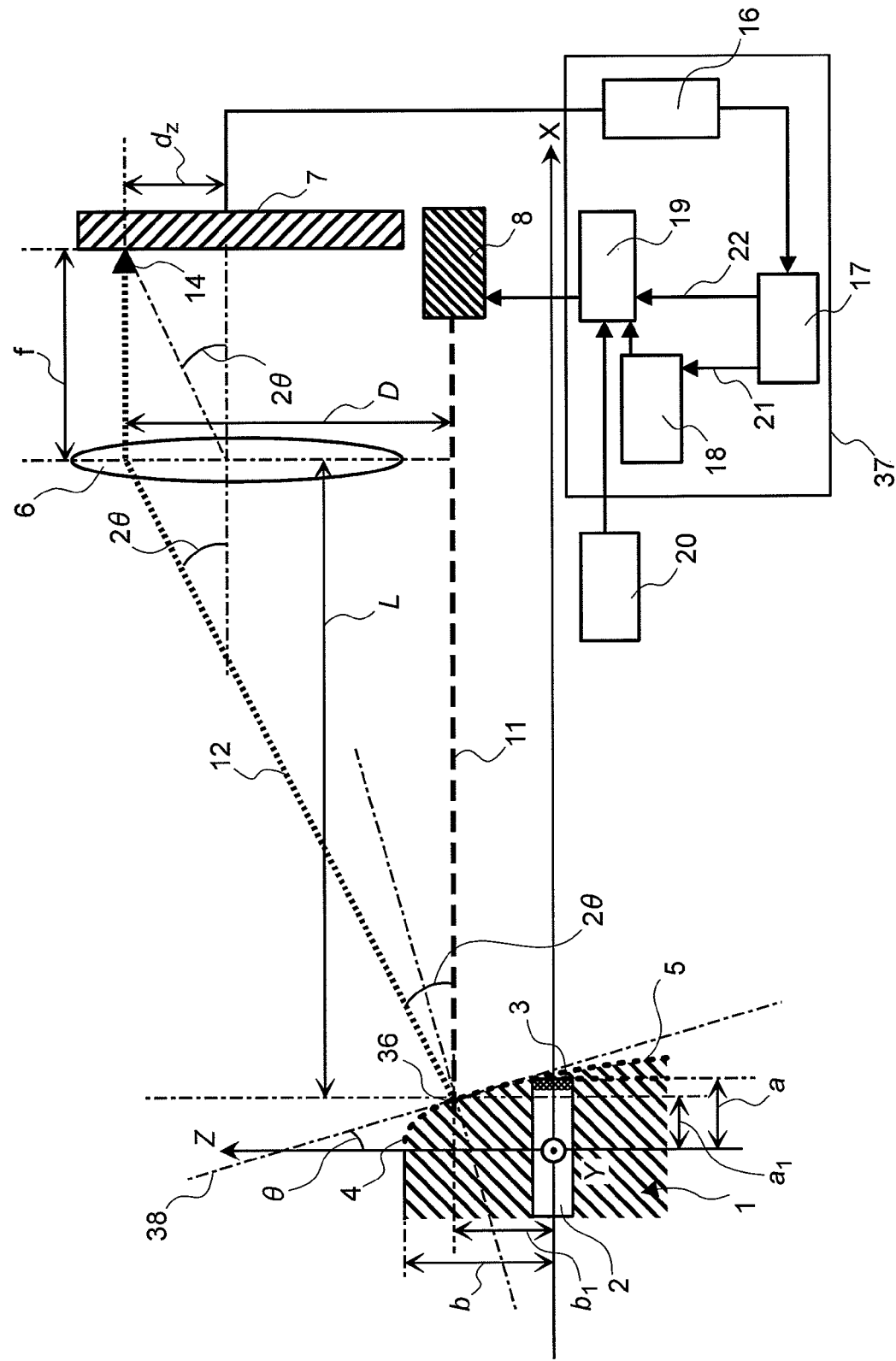
FIG. 4 is a schematic view showing one example of a configuration for seeking or detecting the position of the head slider according to the embodiment.

FIG. 3 is a schematic view of a PD device surface of a four-divided PD, such as aforementioned above, constituting the light receiving portion 7. Four PD devices $P_1$ to $P_4$ are arranged on the surface of the light receiving portion 7 (four-divided PD). FIG. 4 is a schematic view showing a configuration for detecting the position of the head slider 1. With reference to FIGS. 3 and 4, a method for detecting a spot portion of the light receiving portion 7 where light detected therein (the light receiving portion 7) is incident.

First, the light receiving portion 7 converts received light to an electric signal. An amplifier 16 of a regulating portion 37 working as a measuring and regulating mechanism for the amount of emission light (or, "emission light amount," hereinbelow) amplifies the converted electric signal. A spot-position light amount detector portion 17 detects the spot position on the light receiving portion 7 and calculation of the amount of light received in the light receiving portion 7.

The original points are set in the Y-Z coordinates of the light receiving portion 7 so that the Z-axis is positive in the event of light reflection from the upper reflective surface 4 and is negative in the event of light reflection from the lower reflective surface 5, and the Y-axis is positive in the event of light reflection from a first lateral reflective surface and is negative in the event of light reflection from the second lateral reflective surface. In addition, a light-amount central coordinate of spot light 14 incident on the light receiving portion 7 is ($d_y$, $d_z$), and received light amounts of the respective PD devices are represented by $p_1$, $p_2$, $p_3$, and $p_4$. In this case, the relationship represented by Equation (1) is established between the center position and received light amount of the spot light 14. In Equation (1), $\alpha$ is a constant in the event of convert the received light amount to the distance. By using Equation (1), the spot position ($d_y$, $d_z$) can be sought from the received light amount of the respective PD device. Further, where the amount of light incident on the light receiving portion 7 is represented by $P_t$, and the amounts of light incident on the respective PD devices are $p_1$, $p_2$, $p_3$, and $p_4$, Equation (2) is established.

$$d_y = \alpha \frac{(p_1 + p_4) - (p_2 + p_3)}{p_1 + p_2 + p_3 + p_4}, \quad d_z = \alpha \frac{(p_1 + p_2) - (p_3 + p_4)}{p_1 + p_2 + p_3 + p_4} \quad (1)$$

$$p_t = p_1 + p_2 + p_3 + p_4 \quad (2)$$

As a configuration of the light receiving portion 7, it is sufficient if the spot portion where the reflected light is incident can be sought. As such, instead of the configuration of the four-divided PD, which is, as shown in the drawing, split by the Y- and Z-axes, the configuration may be formed in the form of a three-divided PD. More specifically, the configuration may be formed in a manner that any two PD devices are integrated into one unit, or the respective PD device is formed into a fan-like shape (preferably having a center angle of 120 degrees). In this case, when the area sizes of the respective PD devices are different from one another, Equation (1) can be modified by taking the area size ratio into account. In any way, it is preferable that the PD devices be provided symmetric with respect to the Y- and Z-axes in order to accurately detect the reflected-light incident portion. As an other option, a device, such as a position sensitive detector (PSD) or a charge coupled device (CCD), capable of detecting the position of light, may be used instead of the PD device.

The principle for detecting the head slider position by using the optical system according to the embodiment of the present invention will be further described herebelow with reference to FIG. 4. For the sake of brevity, description will be provided with reference to the configuration limited to the X-Z plane.

The original point of the X-axis of the coordinate axes is set to a point of a distance a from the slider light receiving area 3 to the interior of the head slider 1. The original point of the Z-axis is set on a center line of the slider light receiving area 3. FIG. 4 shows a state of the head slider 1 offset by −b1 along the Z direction (or, the state where the optical path 11 for incident light incoming from the light emitting portion 8 is offset by $b_1$ along the Z direction). The slider light receiving area 3 is formed from a material having a reflectance of zero to near zero. The upper and lower reflective surfaces 4 and 5, respectively, are surfaces for reflecting light, and are tilted along the Z-axis direction across a central position (point at 0 on the Z-axis coordinate) of the slider light receiving area 3. The respective surfaces are provided to reflect light along the same direction (upper side in FIG. 4) even when the slider light receiving area 3 varied in attitude along any one of upward and downward directions. The respective surfaces can be formed utilizing a tilt associated with the attack angle of the head slider 1. In such a case, only the slider light receiving area 3 can be processed to be perpendicular to the incident-light optical path 11. By forming the reflective surface to be curved (or to be a curved surface, the reflection angle associated with the reflection position can be varied, thereby making it possible to obtain the amount of variation in a small unit. Especially, in the case of a reflective surface formed to have an ellipsoidal cross section when it is sectioned or cut along a plane perpendicular to the magnetic disk 23 and the slider light (surface of the outflow end of the head slider 1), the reflection angle in the event of a large amount of variation is not increased. Consequently, the size of the lens 6 can be reduced. As the curvature of a curved surface is smaller, the difference or variation in the reflection angle is prone to be larger. As such, taking the size of the magnetic disk 23, the fly height, and the like into account, the curvature is determined so that the reflected light reaches the light receiving portion 7 at an angle not causing the light to impinge on, for example, the magnetic disk 23 and the suspension 13.

Parameters are now defined as follows:

L=Distance along the X direction between the center of the slider light receiving area 3 and the lens 6;

D=Direction in the Z direction between the center of the incident-light optical path 11 and a position in the lens 6 in which the reflected-light the optical path 12 extends;

f=Focal distance of the lens 6;

2θ=Angle between the incident-light optical path 11 for the incident light on the head slider 1 and the optical path 12 for the reflected light from the head slider 1; and d□=Distance along the Z direction from the device center portion of the light receiving portion 7 to the spot light 14 position in the light receiving portion 7.

In the event that parallel light is input to be incident on the convex lens, even when the parallel light is diagonal with respect to the convex lens, the light is focused on a focal plane to which the distance from the lens is the same. As such, 2θ can be represented as Equation (3) below by using the distance L, distance D, focal distance f, and distance d□.

Figure 8:
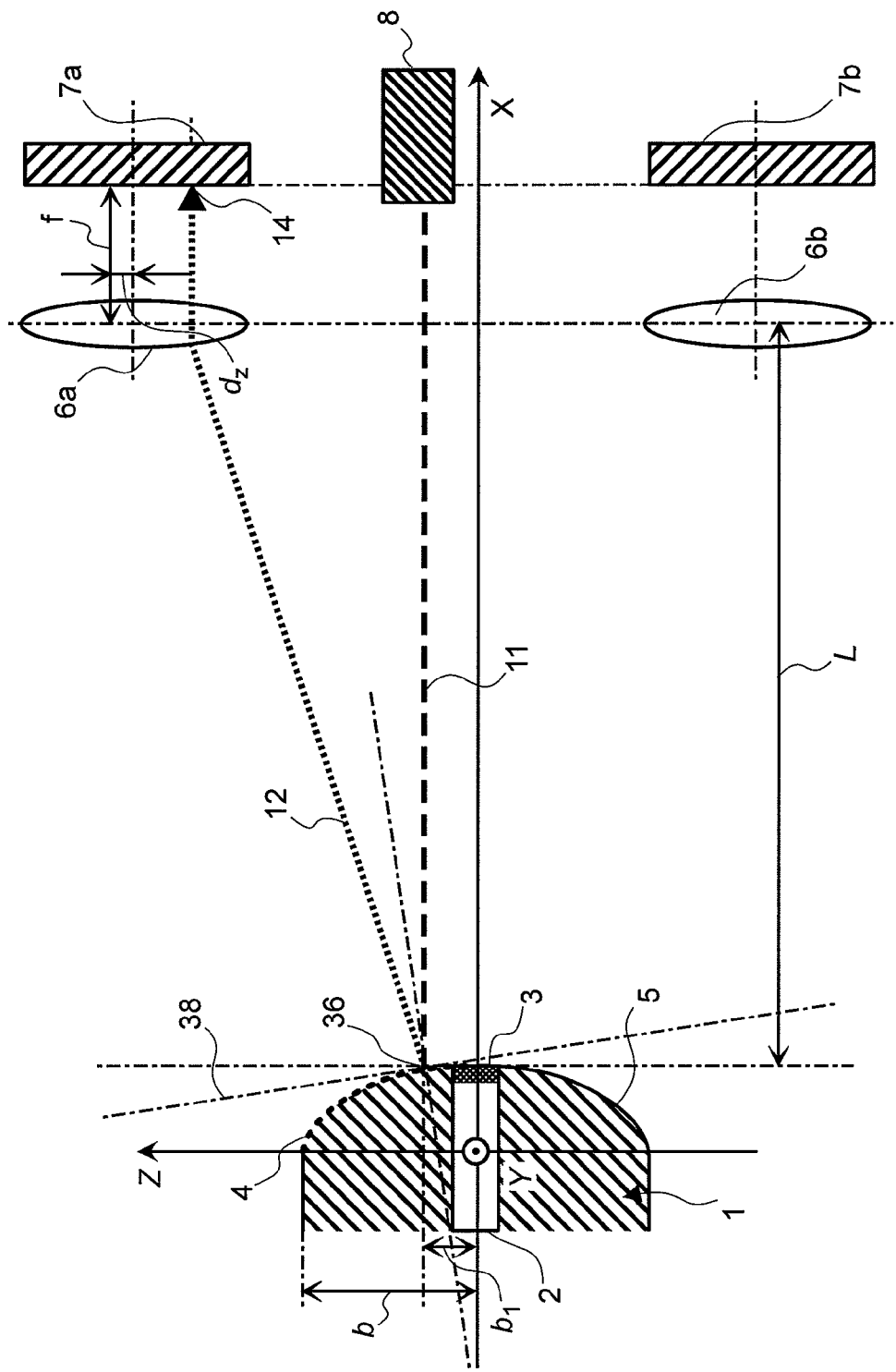
FIG. 8 is a view showing one example of a reflective surface according to another embodiment.

Assume that the upper reflective surface 4 has a part of an ellipsoidal profile (for simplify the description of equations, the upper reflective surface 4 is assumed to have an ellipsoidal profile with a light receiving area ((x, z)=(0, 0)), such as shown in FIG. 8, in the center). In this case, where the position of a contact point 36 between the incident-light optical path 11 and the upper reflective surface 4 is represented by ($a_1$, $b_1$), a tangent 38 is represented at the contact point 36 is represented by Equation (5) given below. In this regard, on the basis of the geometrical relationship shown in FIG. 4, an angle between a surface portion of the upper reflective surface 4 and the slider light receiving area 3 at the contact point 36 can be taken as θ, so that the angle θ is represented by Equation (6). More specifically, the above-described angle θ refers to an angle between the tangent 38 and an extended line of the slider light receiving area 3 or an angle between the tangent 38 and a straight line passing across the contact point 36 and parallel to the slider light receiving area 3.

When θ represents a value approximatable as (tan(θ)≈θ) and (tan²(θ)≈0), Equation is derived from Equations (3) and (6). Then, when the Equation (7) is solved for $b_1$, Equation (8) is derived, whereby the positional relationship between the contact point 36 and the spot light 14 is obtained. As a result of derivation of Equation (8) from Equation (7), two, positive and negative solutions occur. However, which one of the positive and negative solutions is indicative of the deflection amount can be uniquely derived by setting the original points of the X-Y coordinates as shown in FIG. 3 and described in conjunction therewith.

$$\tan(2\theta) = \frac{2\tan(\theta)}{1-\tan^2(\theta)} = \frac{D}{L} = \frac{d_z}{f} \quad (3)$$

$$\frac{x^2}{a^2} + \frac{z^2}{b^2} = 1 \quad (4)$$

$$x = \frac{a^2}{a_1}\frac{b_1}{b^2}z + \frac{a^2}{a_1} \quad (5)$$

$$\tan(\theta) = \frac{a^2}{a_1}\frac{b_1}{b^2} \quad (6)$$

$$d_2 = 2f\frac{a^2}{a_1}\frac{b_1}{b^2}\left(a_1 = \sqrt{a^2 - \frac{a^2}{a^2}b_1^2}\right) \quad (7)$$

$$b_1 = \sqrt{\frac{b^4 d_z^2}{4f^2a^2 + b^2d_z^2}} \quad (8)$$

As described above, by detection of the center position of the spot light 14 in the light receiving portion 7, the position of the contact point 36 can be obtained, and the deflection position of the head slider 1 along the Z-axis direction can be obtained from the position of the contact point 36. Since a parameter of the amount of light is not included in Equation (8), even when the reflectance of the slider light receiving area 3 is low and hence is less obtainable, the position of the head slider 1 can be obtained. Further, Equation (8) does not include the distance L between the slider light receiving area 3 and the lens 6 along the X direction and the distance D between the incident-light optical path 11 and the lens 6 along the Z direction. Consequently, the position of the head slider 1 can be obtained without having influence of the length (distance) between the slider light receiving area 3 and the lens 6.

The spot-position light amount detector portion 17 transfers information 21 indicative of the spot position to an arithmetic portion 18, and transfer information 22 indicative of the amount of light obtained from Expression (2) to a light emission control portion 19. The arithmetic portion 18 calculates the position of the slider light receiving area 3 in accordance with the position detection/obtaining method (i.e., the principle for detecting the position of the head slider 1) described above. Then, the arithmetic portion 18 calculates a light amount correction multiplication factor in accordance with a procedure described below. The multiplication factor is thus calculated so that the amount of light irradiated on the slider light receiving area 3 can be maintained constant, regardless of fluctuation of the slider light receiving area 3.

Figure 5:
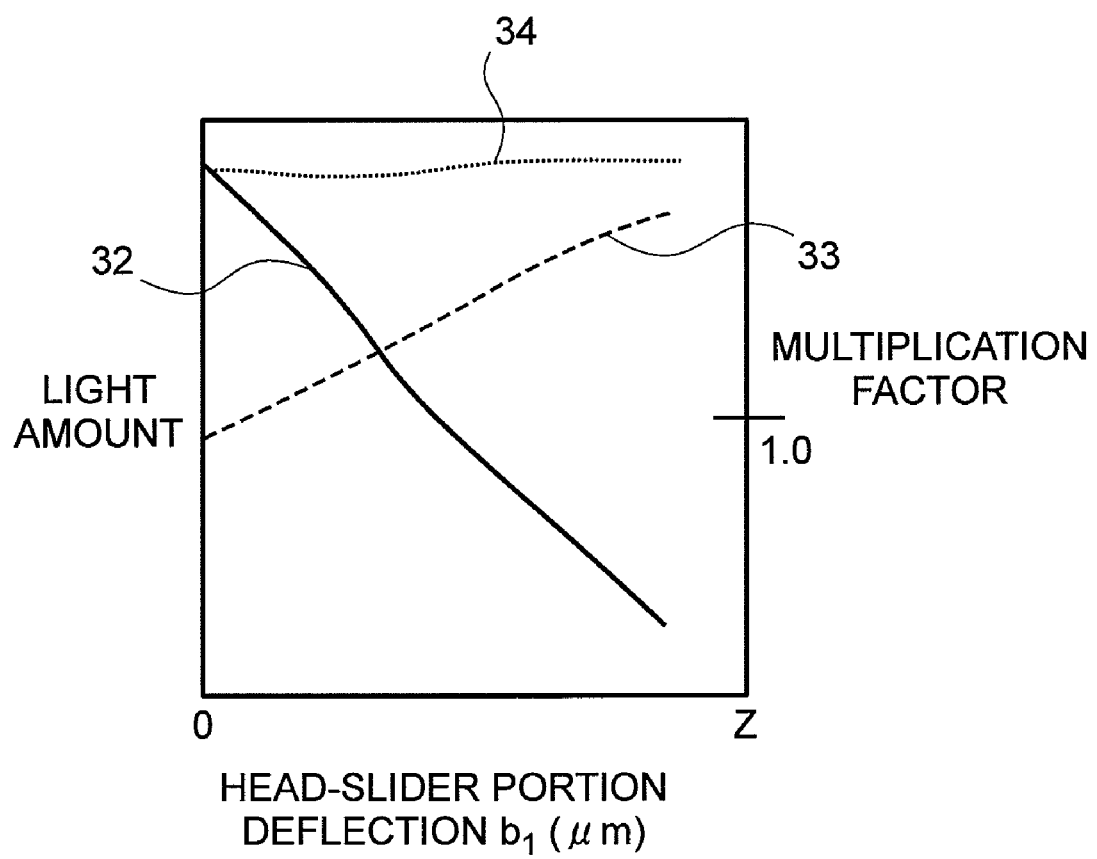
FIG. 5 is an explanatory diagrammatic view showing one example of a method of calculating a light-amount correction magnification according to the embodiment.

FIG. 5 shows the relationship among the deflection amount in the position of the head slider 1 (slider light receiving area 3) in the configuration of FIG. 4, a light amount 32 incident on the slider light receiving area 3 in the event no correction is provided, and a light amount 34 desired to be incident on the slider light receiving area 3. Light output from the light emitting portion 8 is now assumed to follow a Gaussian distribution. In this case, the light amount 32 incident on the slider light receiving area 3 in the event no correction is provided is reduced following a light amount distribution based on the Gaussian distribution in association with an increase in "HEAD-SLIDER POSITION DEFLECTION" (FIG. 5). In order to correct for the reduction in the light amount, the light amount is increased by multiplying the amount of emission light from the light emitting portion 8 by a light amount correction multiplication factor 33 calculated in the arithmetic portion 18. Thereby, the light amount 34 desired to be incident on the slider light receiving area 3 is controlled to a specified value, regardless of the amount of "HEAD-SLIDER POSITION DEFLECTION." Alternatively, the light amount desired to be incident on the slider light receiving area 3 may be controlled to be constant in such a manner that, instead of regulating the amount of emission light, the direction of emission by the light emitting portion 8 is shifted corresponding to the head-slider deflection position or the optical axis is adjusted.

The light amount correction multiplication factor 33 is preliminarily calculated in the following manner. A light distribution state in which light output from the light emitting portion 8 forms in the vicinity of the slider light receiving area 3 is calculated by, for example, simulation, or alternatively, is preliminarily measured by using, for example, a beam profiler. Thereby, the light amount correction multiplication factor 33 is preliminarily calculated from a light amount distribution state of the light. Zero (0) of "HEAD-SLIDER POSITION DEFLECTION" indicative of the horizontal axis of FIG. 5 represents the state of ($b_1$=0) in FIG. 4—in which the slider light receiving area 3 and the light emitting portion 8 are aligned along the same straight line. The light amount correction multiplication factor 33 in the above-described state is set to 1.0.

The light emission control portion 19 controls the amount of emission light from the light emitting portion 8 in accordance with the light amount correction multiplication factor 33 and an overwrite or rewrite (*) command ((*) consistently, "rewrite," hereinbelow) received from a rewrite control portion 20. The light emission control portion 19 verifies the result of control of the amount of emission light from the light emitting portion 8, and then performs closed loop control to make the light amount incident on the head slider 1 to be constant. The rewrite control portion 20 may be a part of the controller (not shown), such as CPU, described early portion of the present section. Further, instead of the arithmetic portion 18, the light emission control portion 19 may be used to calculate the light amount correction multiplication factor.

In the manner described above, the light amount to be incident on the slider light receiving area 3 can be controlled to the constant value specified in the event of recording information on the magnetic disk 23. Accordingly, the control enables preventing a write error due to a light amount deficiency associated with the deflection in the relative position of the head slider 1 and the light emitting portion 8.

The arithmetic portion 18 include registers that stores the information of the position of the slider light receiving area 3, and measures the fluctuation in the position of the slider light receiving area 3 in a predetermined time period. If the head slider 1 is in contact with the magnetic disk 23, a specific vibration occurs. As such, it can be detected whether the head slider 1 is in contact with the magnetic disk 23 by comparing between the positional fluctuation and a specific fluctuation preliminarily stored in a memory (not shown). If the arithmetic portion 18 determines that the head slider 1 is in contact with the magnetic disk 23, then the magnetic disk drive 25 outputs a notification that the head slider 1 is in a state of contact with an external indicator via the CPU (not shown), host, or both of them. The contact detection can be utilized not only during use of the apparatus but also in clearance measurement after product assembly.

Further, the arithmetic portion 18 compares between an initial position and current position of the slider light receiving area 3, and thereby determines detects a variation in the flying posture. More specifically, for example, a preset initial value is preliminarily stored, or an average value representing initially measured relative positions of the slider light receiving area 3 with respect to the light emitting portion 8 during a predetermined time period is preliminarily stored as an initial value into memory. Then, a comparison is made to the average value representing the position of the slider light receiving area 3 in the predetermined time during use or operation of the magnetic disk drive 25. The average value is used for the comparison in order to cancel or suppress instantaneous fly height fluctuation associated with, for example, surface irregularity of the magnetic disk 23.

Suppose that a value of deflection in the position of the slider light receiving area 3 from the state of initial value is greater than a predetermined value (amount of variation). Such an event is detected to be recognized that a flying-attitude variation due to variations in, for example, pitch angle and fly height is occurring as a result of adhesion of foreign matters such as contamination and/or lubrication material onto the rewrite control portion 20 of the head slider 1. In the event that the value greater than the predetermined amount of variation is continued, the arithmetic portion 18 detects that the head slider 1 is in an abnormal state. When such an abnormality in the flying attitude has been detected by the arithmetic portion 18, the magnetic disk drive 25 outputs an abnormal state notification to the external indicator, similar to the event of contact.

The amplifier 16, the spot-position light amount detector portion 17, the arithmetic portion 18, and the light emission control portion 19 may be provided either in the carriage portion 29 or in the same portions of other circuits, such as CPU, of the magnetic disk drive 25, similar to, for example, the light receiving portion 7, the light emitting portion 8. Alternatively, the CPU includes the functions of the components.

As described above, in the present embodiment, the light emitting portion 8 is controlled to emit light in response to the command issued from the rewrite control portion 20 for recording information onto the magnetic disk 23. Control is thus provided to prevent a possible event in which the magnetic disk 23 is heated in an event other than a write event or mode to thereby erase recorded information, and to also prevent heating by the light emitting portion 8. As such, when detecting, for example, the flying attitude of the head slider 1 or contact with the magnetic disk 23 in an event other than a read (playback) event or mode, such as in the write (recording) mode or write (record) seek event or mode, the amount of emission light from the light emitting portion 8 is preferably reduced to be smaller than that in the write mode. Alternatively, polarizing filters, respectively, can be provided in a slider light receiving area 3 and the light emitting portion 8. In this case, the polarizing filter of the light emitting portion 8 is rotated so that emitted light polarized along the same light oscillation direction is incident on the slider light receiving area 3 in the write process mode (write mode). In addition, the light oscillation direction is differentiated to prevent incidence of light onto the slider light receiving area 3 in an event other than the write process event.

Further, suppose that the processing capacity of the arithmetic portion 18 is low to the extent that disables the write process and the flying attitude/contact detection process cannot be executed while correcting for the light amount. Such a case can be overcome in the manner that only light amount correction is in the write mode, and the detections are executed in a mode other than the write mode.

Figure 6:
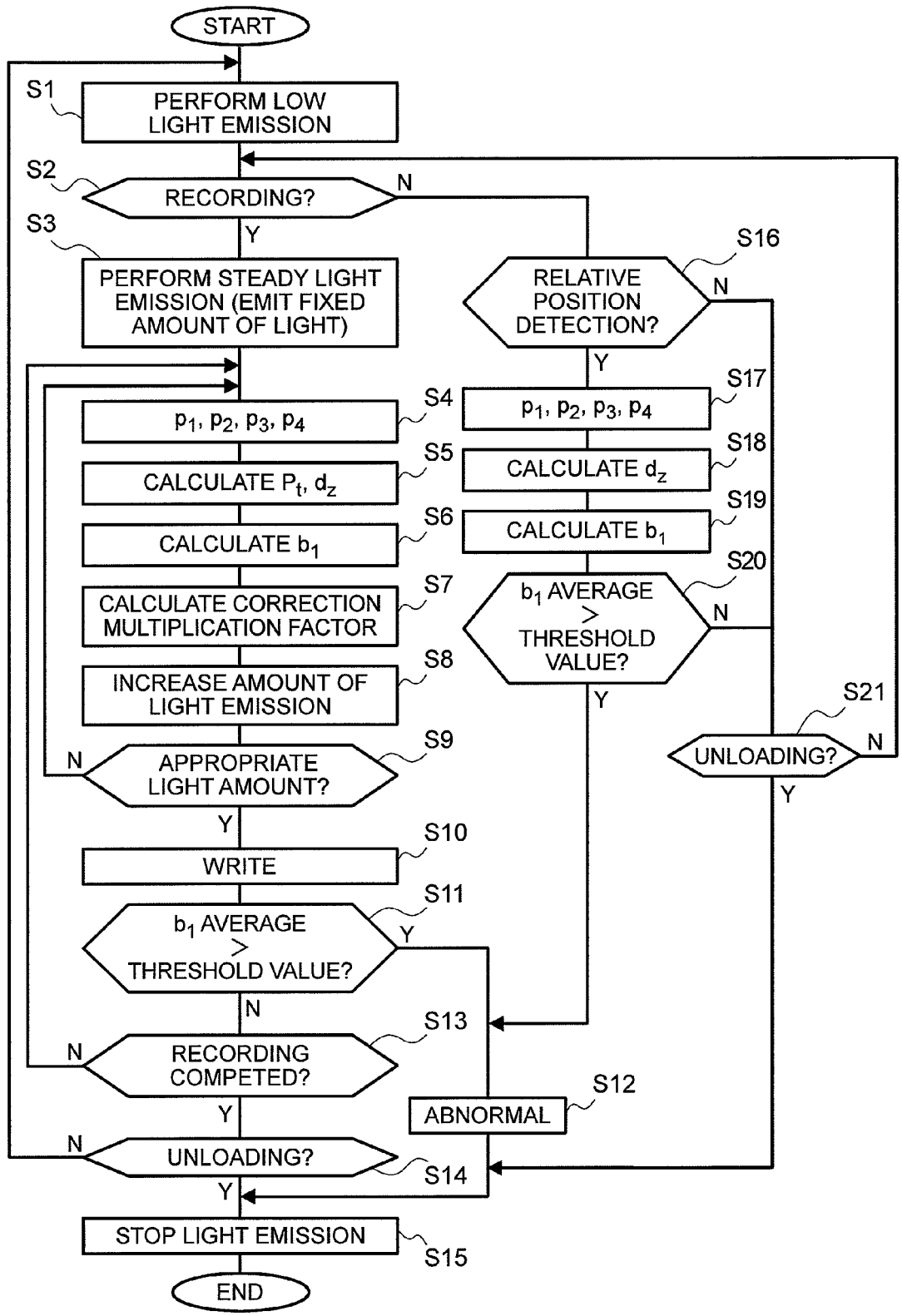
FIG. 6 is a flow diagram representing one example of a process according to the embodiment.

FIG. 6 is a collective flow diagram representing the processes described above.

First, the process starts ("START") upon loading of the head slider 1 on the magnetic disk 23. The state in which the head slider 1 has been loaded is notified to the regulating portion 37 from the CPU of the magnetic disk drive 25. Thereby, low light is emitted from the light emitting portion 8 under the control of the light emission control portion 19 (step S1). The amount of emission light in the event that the light is used only to detect a variation without being used for execution of the write process can be smaller than that in the event of execution of the write process. As such, in this stage, light emission is executed at a low level under the control of the light emission control portion 19. The low level is a level at which light reflected on the reflective surface is detected by the light receiving portion 7 can be detected, the center position of the reflected light can be measured, and there is no risk of loosing information even when the light is projected on the magnetic disk 23.

Subsequently, whether a record command is received is determined by the rewrite control portion 20, and the result is transferred therefrom to the regulating portion 37 (step S2). In the event of the write process, the light emitting portion 8 is controlled by the light emission control portion 19 to generate an amount of emission light (fixed amount of emission light) (step S3). The fixed amount of emission light is preliminarily sought to reduce the coercive force Hc to a level enabling writing through the recording head 24. Then, in the light receiving portion 7, light amounts $p_1$, $p_2$, $p_3$, and $p_4$ received in the respective PD devices are obtained (step S4) and are converted to electric signals, and the data signals are transferred to the amplifier 16. In the amplifier 16, the converted electric signals are amplified. Then, in the spot-position light amount detector portion 17, a light amount $p_t$ and spot position $d_z$ are obtained from the amplified light amounts $p_1$ to $p_4$ and Equations (1) and (2) (step S5).

In the arithmetic portion 18, $b_1$ is obtained from Equation (8) (step S6), a light amount correction multiplication factor for a reduced amount of light to be incident on the slider light receiving area 3 is calculated in accordance with the relative position of the head slider 1 and the light emitting portion 8 (step S7). Then, under the control of the light emission control portion 19, the current or voltage for flowing or applying to the light emitting portion 8 is adjusted correspondingly to the obtained correction multiplication factor, and the amount of emission light is thereby increased (step S8). Then, the arithmetic portion 18 verifies from a received light amount in the PD device whether the correction amount of emission light has been increased and the amount of emission light has been controlled to an appropriate value so that a predetermined light amount is incident on the slider light receiving area 3 (step S9).

If the amount of emission light is not appropriate, then the processing returns to step S4, and a light amount to be corrected is calculated again in the arithmetic portion 18. Otherwise, if the amount of emission light is appropriate, the rewrite control portion 20 controls the write process for writing onto the magnetic disk 23 (step S10). In order to check variation in the flying attitude from the initial state, a $b_1$ average during a predetermined time period is compared with a threshold value (step S11). The b1 average is indicative of the flying attitude at a currently operating time point. As such, if the b1 average has varied to be greater than the threshold value, then an abnormal state of the flying attitude is notified to the CPU (step S12), and the processing terminates. The CPU notifies the abnormal state to a host, and the host in turn displays so that a user can recognize the abnormal state. If no problem with the flying attitude is found, then steps S4 to S12 are repeated until completion of writing. Upon completion of writing, the processing returns to step S2 (step S13).

If a write command or the like is absent and hence the head slider 1 is to be unloaded on a ramp (step S14), then light emission is stopped (step S15), the head slider 1 is unloaded, and the processing terminates. Otherwise, if the head slider 1 is not unloaded, the processing returns to step S1.

If, in step S3, the write process is not executed, then a determination is made whether to detect the relative position of the head slider 1 and the light emitting portion 8 (step S16). The above-described determination is preliminarily made by the user. As descried above, the process configuration may be such that the light amount control and relative position variation detection both performed in the write mode, but neither of them is performed in the mode other than the write mode. Alternatively, the process configuration may be such that only the light amount control is performed (i.e., the b1 average is obtained, but step S11 is not executed) in the write mode, but only the relative position variation detection is performed in a mode other than the write mode.

When detecting the relative position, in the spot-position light amount detector portion 17, a spot position $d_z$ is obtained from the amplified light amounts $p_1$ to $p_4$ and Equations (1) and (2) (step S18). In the arithmetic portion 18, $b_1$ is obtained from Equation (8) (step S19), and a $b_1$ average during a predetermined time period is compared with a threshold value (step S20). If the b1 average has varied greater than the threshold value, then an abnormal state of the flying attitude is displayed (step S12), and the processing terminates. If the relative position detection of step S16 is waved and if no problem with the flying attitude is found step S20, then it is determined whether to unload the head slider 1 on the ramp (step S21). If it is determined to unload the head slider 1, then the processing proceeds to step S15; otherwise, if it is determined to not unload the head slider 1, then the processing returns to step S2.

The start timing of the process is not limited to the timing of loading of the head slider 1 on the magnetic disk 23, but may be the timing when the magnetic disk drive 25 has received a command. For example, the process may be configured such that, in the event that the relative position variation detection is waved, step S1 is not provided, but a step is provided in which, upon receipt of the write command in step S2, the light emission control portion 19 controls the light emitting portion 8 to emit the light (step S3) and to stop light emission after completion of writing (step S13). Thereby, the emission time period in the light emitting portion 8 can be reduced, and the amount of heating in the light emitting portion 8 can be even more reduced.

Figure 7:
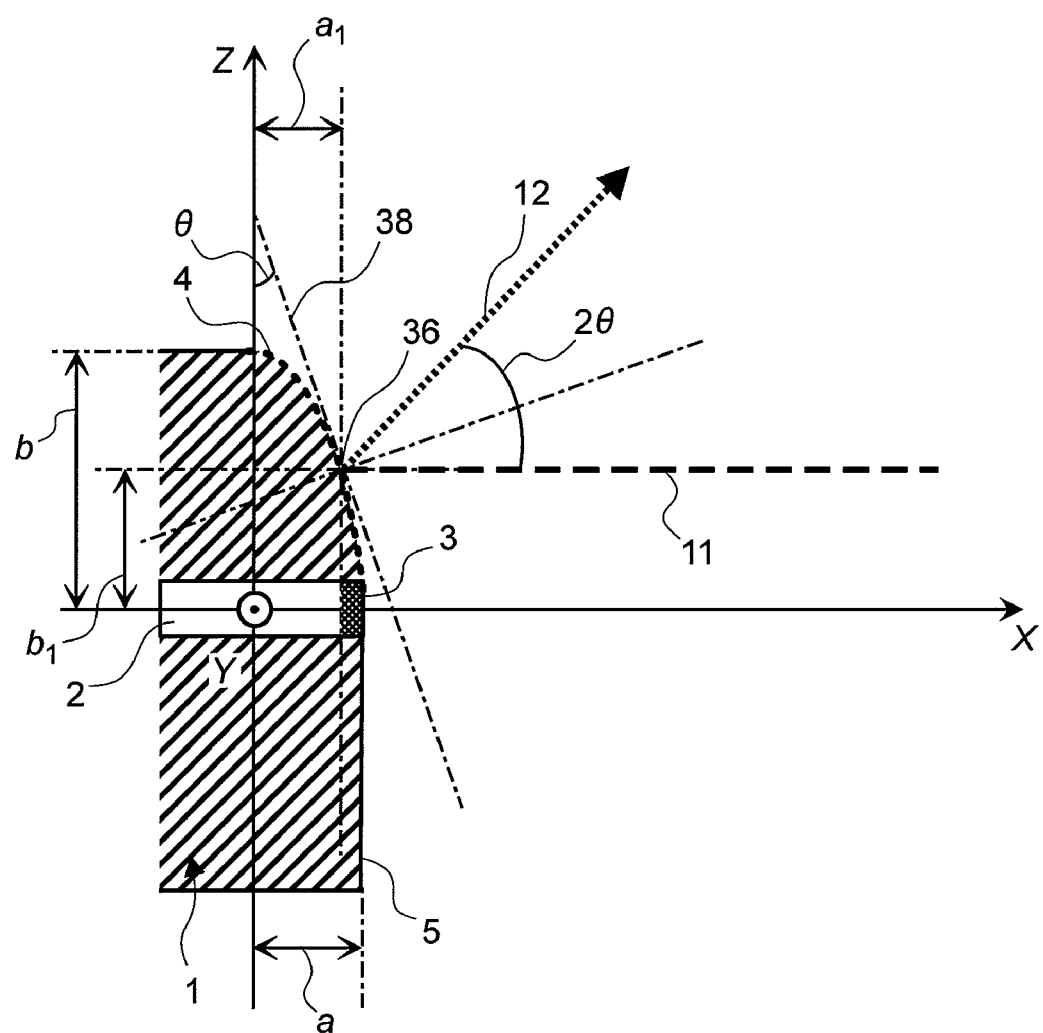
FIG. 7 is a view showing one example configuration of a reflective surface according to the embodiment.

In the configuration shown in FIGS. 2 and 4, in order to be able to address the head slider 1 fluctuations occurrable either in the upward or downward direction, both sides in the Z-axis direction have a profile so that the normal vector of planes vary as departing from the slider light receiving area 3. However, in the case where attention is drawn in the relative position variation with respect to the light emitting portion 8 of the head slider 1 due to the disk surface profile, the primary direction of the position variation is the direction of increasing the fly height, that is, in the upward direction as viewed in the drawings. As such, only the lower side in the Z-axis direction may have the profile to vary as the normal vector departs from the slider light receiving area 3. Alternatively, in the case where the primary object is set to address the variation in the position of the slider light receiving area 3 due to reduction in the fly height of the head slider 1 in association with air pressure variation, a configuration shown as another example in FIG. 7 in which no reflective surface is provided on the lower side can be used as well.

Figure 9:
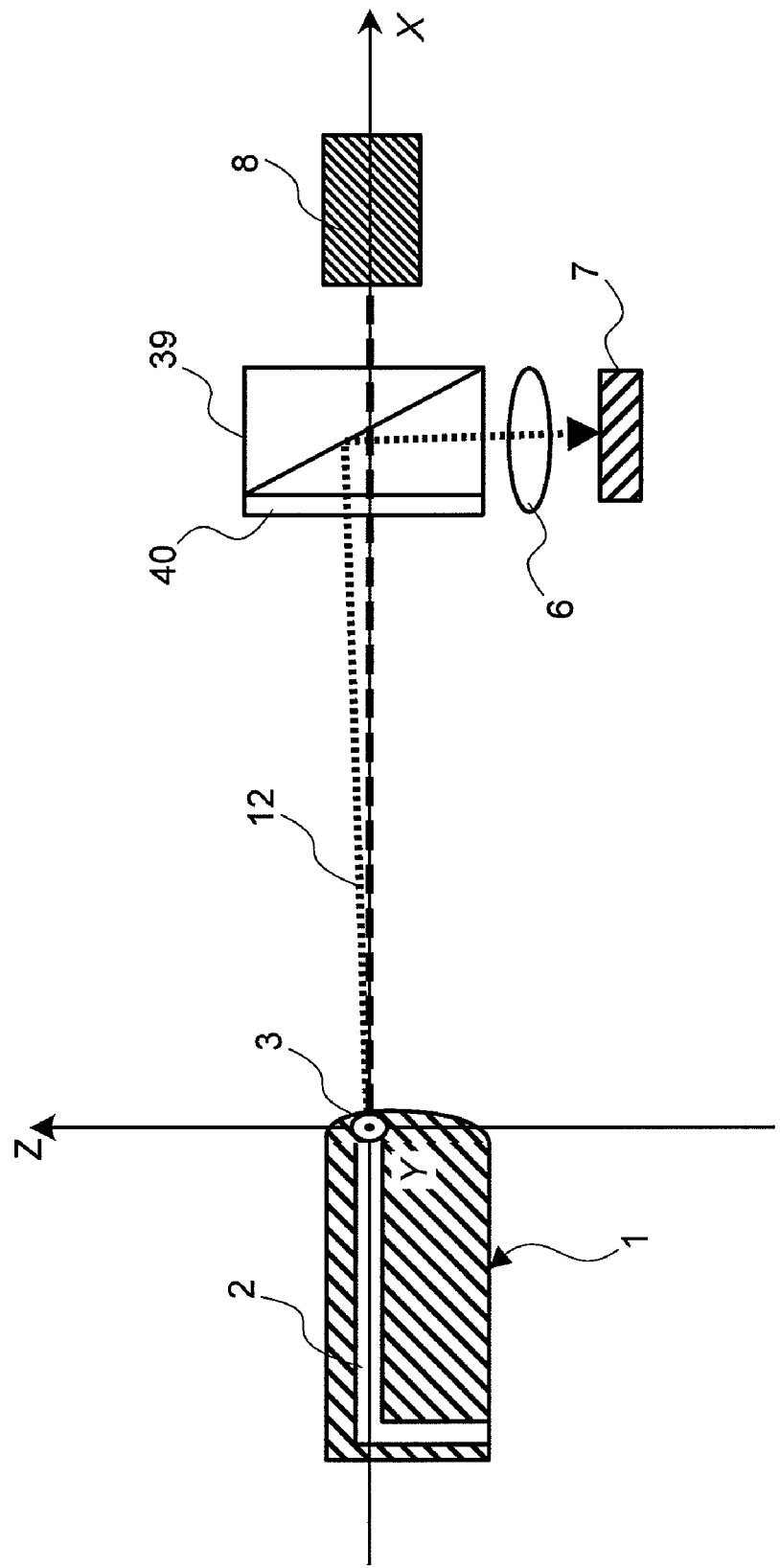
FIG. 9 is a schematic view of one example configuration of a head slider and an optical system according to the embodiment.

Alternatively, as shown in FIG. 8 (configuration of another example), upper and lower reflective surfaces 4 and 5 may have a different ellipsoidal profile formed about the slider light receiving area 3 in the center. In the case of the profile, the upper and lower reflective surfaces 4 and 5 are different from one another in reflection direction, so that, as shown in FIG. 8, the configuration includes a plurality of lenses and light receiving portions, namely lenses 6a and 6b and light receiving portion 7a and 7b. In the case of the embodiment shown in FIG. 8, light reflected on the upper reflective surface 4 is reflected to the lens 6a, and light reflected on the lower reflective surface 5 is reflected to the lens 6b. As such, the ellipsoidal profile is formed identical to that in the above-described embodiment, the lenses 6a and 6b can be small than that of the above-described embodiment. In regard to the coordinates of the X-Z axes for the light receiving portions 7a and 7b, while the Y-axis original point can be identical to that of the above-described embodiment, the Z-axis original point has to be adjusted within a reflected light receivable range. Alternatively, as shown in FIG. 9 (configuration of another embodiment), the configuration may be such that a prism beam splitter 39 and a λ/4 wavelength plate 40 are provided between the light emitting portion 8 and the head slider 1.

Figure 10:
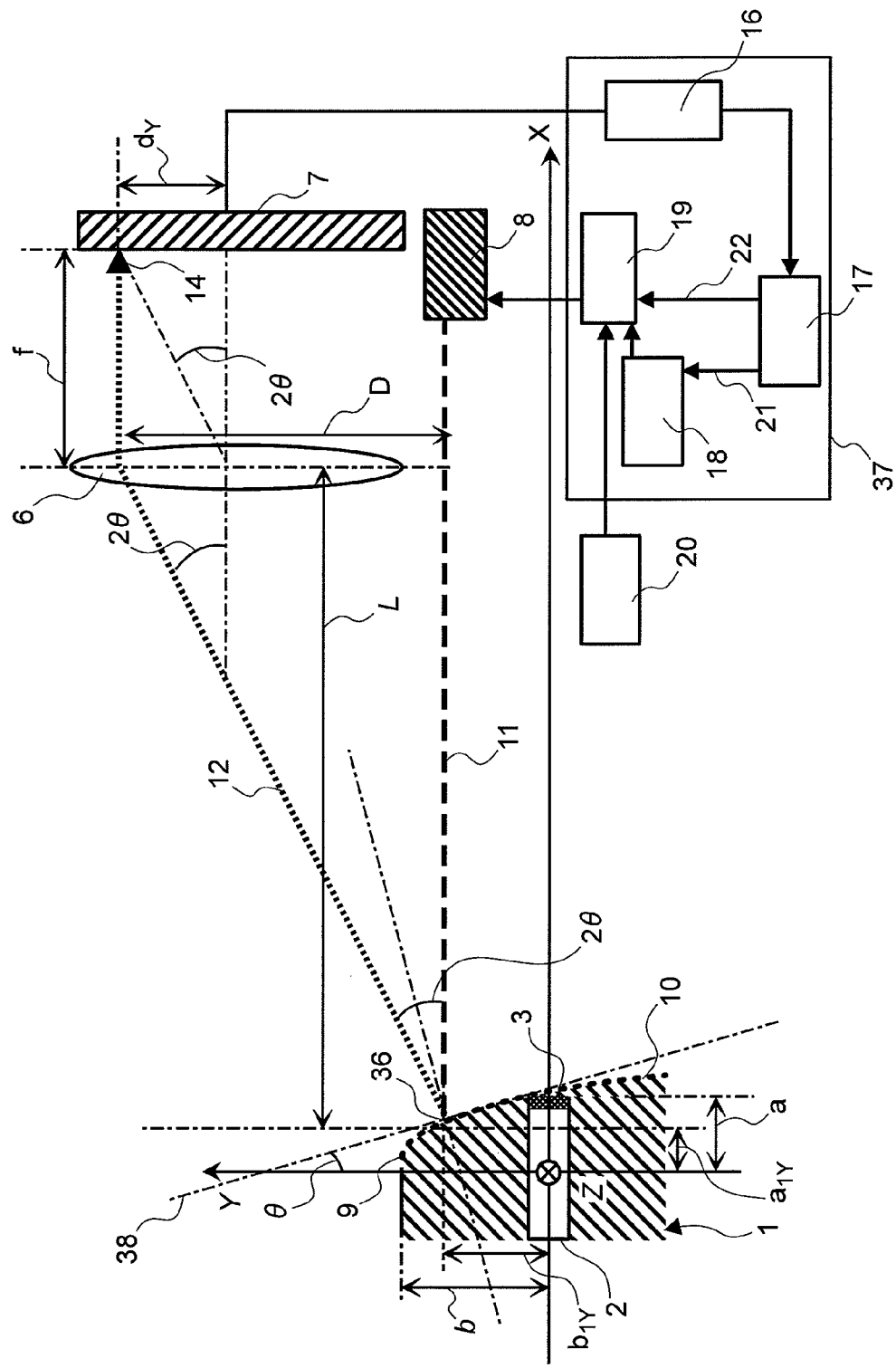
FIG. 10 is one example of a reflective surface according to the embodiment.

The position detection principle illustrated in FIG. 4 is not limited to the configuration in the Z-axis direction, but, as shown in FIG. 10, can be applied to the configuration in the Y-axis direction. Further, as shown in FIGS. 2, 4, and 8, the first and second lateral reflective surfaces 9 and 10 may both have a profile that provides a normal vector varying as departing from the slider light receiving area 3. Alternatively, similarly as in the configuration shown in FIG. 7, there may be arranged a first lateral reflective surface 9 having a profile that provides a normal vector varying as departing from the slider light receiving area 3 and a second lateral reflective surface 10 having a profile that provides a normal vector not varying as departing from the slider light receiving area 3.

In the case of the provision of the first and second lateral reflective surfaces 9 and 10, the contact point $(b_1, a_1)$ are decomposed into a contact point $(b_{1Z}, a_{1Z})$ for obtaining deflection in the Z-axis direction and a contact point $(b_{1Y}, a_{1Y})$ for obtaining deflection in the Y-axis direction. A deflection in the Y-axis direction can be obtained by calculation in accordance with Equations (3), (5), (7), and (8) in which $d_z$ used for the difference in the deflection calculation in the Z-axis direction is used as $d_Y$, and calculation is performed by replacing z with y of Equation (4) (in the case where curvatures of the reflective surfaces are different in the Z-axis and Y-axis directions, a and b in the equation respectively correspond to $a_Z$ and $b_Z$ in the Z-axis direction and $a_Y$, $b_Y$ in the Y-axis direction) and Equation (5). Then, a deflection $b_1$ representing a sum of the deflections respectively obtained corresponding to the Y- and Z-axes can be obtained in accordance with Equation (9) given below.

$$b_1 = \sqrt{b_{1Z}^2 + b_{1Y}^2} \qquad (9)$$

Further, in the above-described embodiment, variation in the relative position of the light emitting portion 8 and the slider light receiving area 3 is obtained from the fly height variation. However, the head slider 1 operates with pitching, yawing, and rolling on the magnetic disk 23, such that the tilt of the reflective surface deflects when the attitude of the head slider 1 deflects. In this case, despite that the relative position of the slider light receiving area 3 and light emitting portion 8 is not varied, the value of $d_Z$ is varied, such that there is a risk of disabling obtaining a proper position variation. To eliminate such a risk, the respective reflective surfaces can be formed to have the profiles of sagittal surfaces with axes of pitching motion in the centers (when cut along planes perpendicular to the magnetic disk 23 and light receiving portion 7, the respective sagittal surfaces are formed to have arcuate profiles with centers coincident with the positions thereof). In this case, even when pitching or the like motion occurs, the tilt of the reflective surface does not vary. Consequently, a proper relative position variation can be calculated.

As described above, according to the heat-assisted magnetic disk drive of the embodiment, in the event of rewriting magnetic information on the magnetic disk 23, the motion of the head slider 1 is measured, the amount of light to be emitted by the light emitting portion 8 is increased or reduced, the amount of light to be incident on the head slider 1 is controlled, and the specified amount of light is irradiated on the magnetic disk 23, to thereby making it possible to perform stabilized rewriting.

As above, the embodiment has been described primarily on the head slider 1 including only the recording head 24. However, the head slider 1 may further include a playback head, which is a device for reading information recorded on the magnetic disk 23 or may use a recording and playback head, which is a device for recording and retrieve.

A practical example of a 2.5-inch magnetic disk drive employing the present techniques will be described herebelow with reference to FIGS. 2, 4, 7, and 10 and 11.

Conditional factors applied in the example were as follows. In accordance with the femto-size head slider dimensions, the Z- and Y-direction thicknesses of the head slider 1, respectively, are 230 μm and 700 μm. The Z- and Y-direction thicknesses of the slider light receiving area 3 of the head slider 1 are 10 μm, and the reflectance thereof is near 0. The upper reflective surface 4 has an ellipsoidal profile in which a=1.00 μm and b=100 μm, and also the first lateral reflective surface 9 has an ellipsoidal profile in which a=1.00 μm and b=100 μm. Similarly as in the configuration shown in FIG. 6, the lower reflective surface 5 and the second lateral reflective surface 10 are planes parallel to the slider light receiving area 3. The focal distance f of the lens 6 is 5000 μm. The diameter of the incident-light optical path 11 follows the normal distribution at about 20 μm, and the slider light receiving area 3 and the light emitting portion 8 are in the same linear state. An LD capable of increasing or reducing the amount of light by 30% and a lens capable of producing parallel light were used. In the event that the centers of the slider light receiving area 3 and the incident-light optical path 11 match with one another, that is, in the event that the head slider does not deflect, the rate of the amount of light incident on the slider light receiving area 3 to the overall light amount was about 57%.

First, a method of obtaining the amount of deflection of the head slider along the Z direction because of runout will be described herebelow.

As shown in FIG. 4, the Z coordinate of the contact point 36 between the center of the incident-light optical path 11 and the head slider 1 is set on $b_1$. On the XY plane in FIG. 4, $b_1$ is positioned in the slider light receiving area 3, in which the reflected light cannot be obtained. However, since $b_1$ is positioned on the ellipsoidal reflective surface in an area satisfying that |Y|>5 μm, the reflected light can be obtained. Further, since the amount incident light is distributed in accordance with the normal distribution, the amount of light incident on the slider light receiving area 3 is about 50% and is reduced by about 7%. In this case, when a value representing the position $d_z$ of the spot light 14 on the light receiving portion 7, which was obtained from Expression (1), is 4.0 μm, $b_1$ is obtained from Equation (10) shown below.

$$b_1 = \sqrt{\frac{100^4 \times 4.00^2}{4 \times 5000^2 \times 1^2 + 100^2 \times 4.00^2}} \qquad (10)$$

$$b_1 = 4.00 \ [\mu m]$$

Thus the position $b_1$ of the contact point 36 can be obtained, and a deflection amount $b_{1Z}$ of the head slider 1 from the position of the contact point 36 along the Z direction can be obtained to be 4.00 μm.

Also an amount of deflection of the head slider along the Y direction because of skew and the like can be obtained in a method similar to the method described above. When a value representing the position $d_y$ of the spot light 14 on the light receiving portion 7, which was obtained from Expression (1), is 4.0 μm, $d_z$ in Equation (8) is substituted by $d_y$, and "dy=1.00 μm" is assigned therein, $b_{1Y}$ in the Y-direction is 1.0 μm. Then, the light amount correction magnification 33 is determined to be 1.13 from a relationship such as shown in FIG. 5, and the amount of light produced in the light emitting portion 8 is multiplied by 1.13, whereby the amount of light incident on the slider light receiving area 3 is about 57%. As such, the reduction in the amount of light incident on the slider light receiving area 3, which reduction is caused by variation in position variation of the head slider 1, can be cancelled. Consequently, the amount of light to be irradiated on the slider light receiving area 3 can be controlled to a specified constant amount.

The invention claimed is:

1. A head stack assembly, comprising:
a light emitting portion for generating emission light for irradiation onto a medium that records information;
a head slider including a light receiving area for receiving emission light from the light emitting portion, a waveguide for guiding the light incident on the light receiving area into a head slider, an injection portion for irradiating the light guided by the waveguide onto the medium, a reflective surface for reflecting emission light from the light emitting portion, and a device for writing information onto the medium;
a suspension for supporting the head slider;
a carriage portion for supporting the suspension;

a light receiving portion for detecting light reflected on the reflective surface; and an adjusting mechanism for adjusting an amount of the emission light from the light emitting portion in correspondence to a result of the detection.

2. A head stack assembly as claimed in claim 1, wherein the light emitting portion, the light receiving portion, and the adjusting mechanism are disposed in the carriage portion.

3. A head stack assembly as claimed in claim 1, wherein the adjusting mechanism is configured to obtain an amount of light incident on the light receiving area in accordance with an amount of light detected by the light receiving portion.

4. A head stack assembly as claimed in claim 1, wherein the adjusting mechanism includes:

an arithmetic portion for obtaining an amount of light incident on the light receiving portion in accordance with a value detected by the light receiving portion;

a light emission control portion for controlling the amount of the emission light from the light emitting portion in accordance with a result obtained by the arithmetic portion.

5. A head stack assembly as claimed in claim 4, wherein the arithmetic portion is configured to obtain an amount of light incident on the light receiving area in accordance with a position of and an amount of light received by the light receiving portion.

6. A head stack assembly as claimed in claim 1, wherein the reflective surface is disposed on a periphery of the light receiving area configured to receive light from the light emitting portion, and includes at least one portion formed of a curved surface.

7. An information recording apparatus, comprising:

a medium configured to store information;

a light emitting portion configured to generate emission light toward a reflective surface;

a light receiving portion configured to detect light emitted onto the reflective surface;

an adjusting mechanism configured to adjust an amount of the emission light from the light emitting portion when recording information onto the medium based on a result of the detection; and a head slider including: a light receiving area for receiving emission light from the light emitting portion, a waveguide for guiding the light incident on the light receiving area into a head slider, an injection portion for irradiating the light guided by the waveguide onto the medium, a reflective surface for reflecting emission light from the light emitting portion, and a device for writing information onto the medium.

8. An information recording apparatus as claimed in claim 7, further comprising:

a suspension configured to support the head slider; and a carriage portion configured to support the suspension;

wherein the adjusting mechanism is configured to increase the amount of the emission from the light emitting portion when recording information onto the medium to be greater than the amount of the emission light when playing back information from the medium.

9. An information recording apparatus as claimed in claim 8, wherein the adjusting mechanism is configured to cause the light emitting portion to detect light emission only when information recording onto the medium.

10. An information recording apparatus, comprising:

a medium configured to store information;

a light emitting portion configured to generate emission light toward the reflective surface;

a light receiving portion configured to detect light emitted onto the reflective surface;

a adjusting mechanism configured to adjust an amount of the emission light from the light emitting portion based on a result of the detection;

an arithmetic portion configured to obtain an amount of variation in a relative position of the light emitting portion and the head slider in a direction perpendicular or parallel to the medium in accordance with a result of light reception in the light receiving portion; and a head slider including: a light receiving area for receiving emission light from the light emitting portion, a waveguide for guiding the light incident on the light receiving area into a head slider, an injection portion for irradiating the light guided by the waveguide onto the medium, a reflective surface for reflecting emission light from the light emitting portion, and a device for writing information onto the medium.

11. An information recording apparatus as claimed in claim 10, wherein the arithmetic portion is configured to detect contact between the medium and the head slider in accordance with fluctuation in the amount of variation.

12. An information recording apparatus as claimed in claim 10, wherein the arithmetic portion is configured to detect variation in a pitch angle of the head slider in accordance with fluctuation in the amount of variation.

13. An information recording apparatus as claimed in claim 10, wherein the arithmetic portion is configured to output a notification of an abnormal state when a value exceeding a predetermined amount of variation is continued for a time period longer than a predetermined time period.

14. An information recording apparatus as claimed in claim 10, further comprising:

a suspension configured to support the head slider; and a head assembly configured to support the suspension, wherein the head assembly includes the light emitting portion.

15. An information recording apparatus as claimed in claim 10, wherein the arithmetic portion is configured to obtain the amount of variation in the relative position in accordance with a position of the light detected in the light receiving portion.

16. An information recording apparatus as claimed in claim 10, wherein the reflective surface is disposed on a periphery of the light receiving area configured to receive light from the light emitting portion, and includes at least one portion formed of a curved surface.

17. An information recording apparatus as claimed in claim 10, further comprising:

a light emission control portion configured to adjust the amount of the emission light from the light emitting portion in accordance with the amount of variation.

18. An emission light amount adjusting method for an information recording apparatus, the method comprising the steps of:

generating emission light by a light emitting portion, for irradiation onto a medium configured to record information toward a head slider;

receiving emission light from the light emitting portion, using a light receiving area;

guiding light incident on the light receiving area into a head slider, using a waveguide;

irradiating the light guided by the waveguide onto the medium, thereby writing information onto the medium;

reflecting at least part of the emission light from the light emitting portion;

detecting the reflected light; and adjusting an amount of the emission light from the light emitting portion based on a result of the detection.

19. An emission light amount adjusting method as claimed in claim 18, wherein the step of adjusting an amount of the emission light based on a result of the detection of the reflected light includes the steps of:
   obtaining an amount of light incident on a light receiving area of the head slider in accordance with the reflected light; and
   adjusting of the amount of the emission light in correspondence with the obtained amount of light.

20. An emission light amount adjusting method as claimed in claim 19, wherein the step of obtaining an amount of light incident on a light receiving area includes the steps of:
   obtaining a position of and an amount of the reflected light;
   obtaining an amount of variation in a relative position of the emission light generated toward the head slider and the head slider in a direction perpendicular or parallel to the medium in accordance with the obtained position; and
   obtaining an amount of the incident light in accordance with the obtained amount of variation in the relative position and the obtained amount of the reflected light.

* * * * *